May 18, 1937. H. J. MURRAY 2,081,061
CAM ACTUATED CLUTCH RING SYNCHRONIZER
Original Filed Aug. 14, 1925
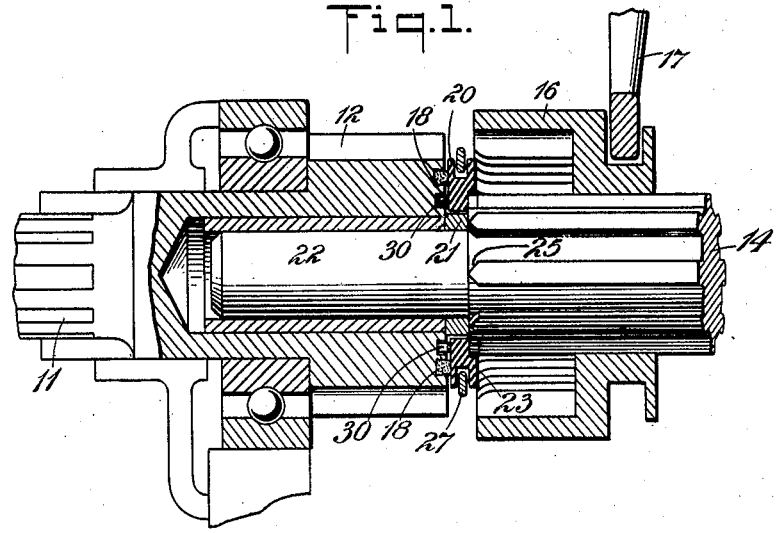
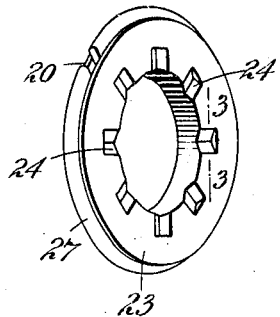
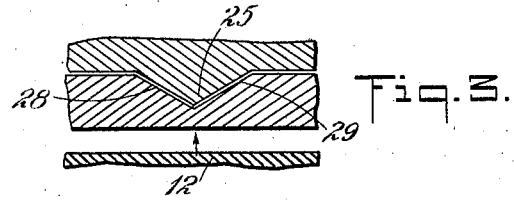
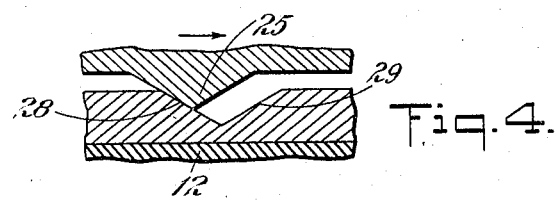
INVENTOR
Howard J. Murray
BY
Warren S. Orton
ATTORNEY Patented May 18, 1937

2,081,061

UNITED STATES PATENT OFFICE 2,081,061

CAM ACTUATED CLUTCH RING SYNCHRONIZER

Howard J. Murray, New York, N. Y., assignor, by mesne assignments, to Borg-Warner Corporation, Chicago, Ill., a corporation of Illinois Application August 14, 1925, Serial No. 50,279
Renewed October 17, 1928

39 Claims. (Cl. 192—53)

The invention relates to a synchronizing device for causing a pair of clutch elements, or other power transmitting members, to approach the same speed before they are moved into or just prior to being moved into, meshing or interdriving relation, and constitutes an improvement in the constructions disclosed in my joint patent with Walter S. Rugg, No. 1,579,728, granted April 6, 1926, and in Patent No. 1,511,232, October 14, 1924.

In the prior art as disclosed in the above identified patents, the synchronizing effect between two axially shiftable jaw elements is provided by means of a retractile spring disposed in the path of movement of the jaw elements and arranged to provide a temporary friction drive which will give under the force of the continued relative movement of the jaw elements to be forced into an inoperative position thus permitting the elements to move into interengaged position. In this construction there was disclosed a manually actuated shift fork engaging the shiftable jaw element and constituting the source of power for shifting the element, and for overcoming the resistance of the retractile spring and for reducing the momentum of the faster moving jaw element. This arrangement is entirely satisfactory provided there is sufficient power available, either manual or mechanical, acting on the shift fork for doing this work. It is appreciated, however, that under some conditions, such for instance as a heavy truck rushing down hill, there is developed a powerful turning torque in one of the jaw elements and the operator has not sufficient power in his arm to brake the relative rotary movement between the jaw elements and any synchronizing effect is negligible.

The present disclosure features the utilizing of the power inherent in the relative movement of the rotating jaw elements for the purpose of supplying the actuating force necessary to cause the synchronizing effect. This function is not broadly new in the present disclosure for it is described in connection with a synchronizing gear carried by a shiftable gear unit in the following applications: Serial No. 614,502, filed Jan. 23, 1913; Serial No. 633,610, filed Apr. 21, 1923 now Patent No. 1,803,535, May 5, 1931, and this disclosure is specifically limited to the situation where the jaw clutch elements to be synchronized are mounted for axial relative movement to and from their inter-engaged driving relation.

The primary object of the invention is to provide a simplified form of synchronizing effect for use in power transmission organizations where relatively shiftable power elements are designed for axial movement and where the synchronizing is effected by the force developed by the relative momentum inherent in the two clutch jaw elements about to be synchronized and meshed.

Various other objects and advantages of the invention will be in part obvious from an inspection of the accompanying drawing and in part will be more fully set forth in the following particular description of one form of device embodying my invention, and the invention also consists in certain new and novel features of construction and combination of parts hereinafter set forth and claimed.

In the accompanying drawing:—

Figure 1 is a view in axial cross section of two clutch jaws equipped with a self-acting synchronizer device constituting a preferred embodiment of the invention;

Figure 2 is a perspective view of the combined synchronizer and cam ring removed from its associated parts in Figure 1;

Figures 3 and 4 are detailed views taken transversely of one of the camming recesses, for instance on the line 3—3 of Figure 2, and showing in Figure 3 the parts in normal inoperative position and in Figure 4 showing the cam forcing the synchronizer ring into its clutching engagement.

In the following description and in the claims, parts will be identified by specific names for convenience of expression but they are intended to be as generic in their application to similar parts as the art will permit.

In the drawing there is shown two power shafts 11 and 14 in axial alinement. Secured to the telescoping end of the shaft 11 is a gear 12 constituting an axially fixed element of a mechanical clutch and referred to hereinafter as a male clutch element or jaw. The shaft 14 has splined thereto a shiftable clutch element 16 referred to hereinafter as the female clutch element or jaw and into which telescopes the male element 12 as the element 16 is shifted from right to left of the position shown in Figure 1 by the actuation of the shift fork 17. The inner end of the gear 12 provides a friction face which may be formed of a removable insert 18. A synchronizer 20 is mounted for free rotary movement in a bearing ring 21 positioned on the reduced end 22 of the shaft 14 and between the unreduced end of this shaft and the adjacent end of the gear 12. The synchronizer includes a combined clutch and camming ring 23 mounted on the ring 21 and which may be integral with or otherwise secured thereto. The ring 23 has a slight freedom of movement axially of the shaft to and from a side face clutching engagement with the end of the gear 12. The clutch ring is provided with a peripheral groove in which is mounted a split resistant ring 27. This ring is so proportioned that normally, when in expanded position, it projects radially out of the groove and beyond the peripheral outline of the clutch ring. When so positioned the split ring is in the path of movement of the teeth forming the female element 16, the free ends of which teeth are bevelled as is usual in such constructions.

In the above identified Patent 1,579,728 the ring 23 was secured to the shaft to rotate therewith and for this purpose square recesses in the side of the ring received projections forming part of the shaft. The present disclosure features an axially directed camming action between the synchronizer and the shaft 14 to cause the synchronizer to bear forcefully against the adjacent end of the shaft 11 or its gear 12. For this purpose one side face of the clutching ring is provided with circumferentially spaced recesses 24 opposite side faces 28 and 29 of which are inclined to form the recesses V-shaped in cross section and with the opposing faces facing in opposite directions circumferentially of the ring. The opposing end of the unreduced portion of the shaft 14 is provided with a plurality of V-shaped projections 25 in the form of isosceles triangles in cross section, one for each of the recesses 24, similarly spaced and having a configuration the complement of the recess.

In practice it has been found that an angle between the sides of the recess, and at the apex of the projections, when formed of sixty-one degrees gives the maximum camming effect and at the same time eliminates danger of the cams "freezing" in locked engagement where heavy torque forces are acting on the same.

In order to defeat any tendency of the camming ring from sticking to the gear 12 a separating spring 30 is disposed therebetween. In its normal action this spring will tend to move the ring to the right of the showing in Figure 1 and as indicated by the arrow in Figure 3 and out of its clutching engagement with the shaft 11. The spring 30 maintains the friction clutch in its normal, inoperative or unclutched position as shown in Fig. 3, except of course during that time while the bevelled ends of the teeth of the female element 16 are bearing axially against the side of the projected ring 27 to shift the friction clutch element 23 into its initial clutching position against the resistance of the seating spring 30 and when pressed by the action of the cams, or, differently expressed, the engagement between the jaw 16 and the ring 27 is released prior to the interengaging of the jaws 12 and 16 in their clutching relation as recited in the prior Patent 1,579,728. As the axial play of the ring 23 is not sufficient to permit the projections 25 to clear their associated recesses the ring will normally turn idly with the shaft 14.

In operation the operator engaging the control 17 will shift the same to the left with any degree of manual force, but of course sufficient to overcome the relatively weak force of the spring 30 should such a spring be used. This will bring the bevelled ends of the teeth of the female element into bearing engagement with the split ring which at this time will function as a resilient stop and transmit the movement of the element 16 onto the axially shiftable clutch ring and in this way cause the clutch ring to be forced into clutching engagement with the end of the gear 12. As the shafts are turning at different speeds the gear 12 will tend to carry the ring 23 with it, thus tending to rotate the ring with a force proportionate to the momentum of the gear 12 and associated parts. The inclined faces of the recesses facing in the direction of rotation of the ring will be jammed against the opposing sides of the projections and the inclination of these faces will cause the force exerted on the ring to be resolved into components, one of which will act axially and thus cause an increase in the frictional clutching effect between the ring and gear 12 as more particularly shown in Figure 4.

Should the gear 12 be moving slower than the shaft 14 then the reverse of the action described will take place, the opposite side faces of the cams will be engaged, but in either case relative rotary movement between the synchronizer and shaft 14 will cause the synchronizer to be forced into powerful frictional engagement with the end of the gear 12 and thus with the shaft 11.

It will thus be seen that the greater the rotary force acting on the camming and synchronizing ring the greater is the resulting clutching effect between the ring and gear 12. After the action is initially inaugurated by the hand action of the operator no application of power to effect the synchronizing is necessary for the relatively rotating parts themselves supply all the requisite power and if there is no relative rotation there is, of course, no necessity for synchronizing.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. In a device of the class described, the combination of a relatively fixed member, a coacting member movable axially thereof into interdriving engagement therewith, a shaft on which said coacting member is splined, a synchronizer for causing the members to approach the same speed prior to moving into engagement, said synchronizer constituting a friction clutch element for engaging one of the members, said clutch element and said shaft provided with coacting recesses and projections coacting to provide a plurality of camming means for forcing the synchronizer ring into its clutching engagement.

2. In a device of the class described, the combination of a pair of coacting clutch jaws having a common axis of rotation and movable axially relative to each other to and from an interdriving position, means between the jaws for causing them to approach the same speed before they assume said interdriving position, said means including a clutch element having an axial movement and coacting with one of the jaws to form a friction clutch therewith, a retractile stop between the clutch element and the other jaw for transmitting axial movement from said other jaw to the clutch element until resisted by the engagement of the clutch element with its cooperating clutching jaw and camming means actuated by relative rotary movement between said clutch element and said cooperating clutching jaw for causing said friction clutch to become effective.

3. In a device of the class described, the combination of a mechanical clutch including a pair of jaws having a common axis of rotation and movable axially relative to each other to and from an interengaging position, means between the jaws for causing them to approach the same speed before they assume said interengaging position, said means including a clutch element having an axial movement and coacting with one of the jaws to form a clutch, a spring stop carried by the clutch element, normally disposed in the path of movement of the other jaw and adapted to be engaged by said other jaw to move the clutch element into operative position, and said clutch element provided with inclined surfaces forming part of a cam for forcing the clutch element axially into clutching position with the first named jaw.

4. In a device of the class described, the combination of a shaft, a clutch ring mounted on the shaft, and having a slight freedom of movement into a clutching position, means for limiting said slight freedom of movement of the clutch ring, a spring stop ring carried thereby, normally projecting beyond the outlines thereof, a member shiftable on the shaft, adapted to engage said stop ring to cause the clutch ring to move into operative position and said shiftable member adapted to overcome the resistance of said spring ring and telescope the clutch ring, and a camming connection between the clutch ring and said shaft for shifting the clutch ring axially on the shaft.

5. In combination with two members having clutch jaws to be interengaged, of a synchronizer when actively disposed between said members tending to cause them to approach the same speed, said synchronizer including a retractile spring stop normally disposed in the path of relative axial movement of the members and adapted to provide a stop clutch connection therebetween, and means controlled by a relative rotary movement between the synchronizer and one of the members for forcing the synchronizer into clutching engagement with the other member.

6. In a device of the class described, the combination of a pair of clutch elements mounted for relative axial movement to and from a clutching position, a synchronizer separate from said elements for causing the elements to approach the same speed prior to interengaging, means for causing one of the elements to force the synchronizer into frictional engagement with the other element and means turning with said first named element and controlled by the relative rotary movement between the synchronizer and itself for forcing the synchronizer more firmly into its clutching engagement with said other element.

7. In a device of the class described, the combination of a pair of clutch elements mounted for relative axial movement to and from a clutching position, a synchronizer positioned between the elements for causing the elements to approach the same speed prior to interengaging, said synchronizer having a slight freedom of movement axially relative to said elements, and a camming means for forcing the synchronizer axially positively into its operative clutching engagement with one of the elements.

8. In a device of the class described, the combination with a shaft, a clutch element mounted thereon to turn therewith, control means for shifting the element axially, a synchronizer carried by the shaft turning therewith and constituting an element of a friction clutch, said clutch element having a limited movement axially and having a limited rotary movement relative to the clutch element, said clutch element provided with a V-shaped recess and said shaft provided with a similar shaped projection fitting therein and coacting therewith to provide a cam for shifting the clutch element axially.

9. In a device of the class described, the combination of a shaft, a relatively fixed clutch element, a coacting clutch element mounted on the shaft for a limited movement axially to and from its clutching position, manually actuated means movable on the shaft for forcing the elements into frictional driving relation, said shaft and coacting clutch element provided with a recess and a projection extending into the same and coacting to form a cam for forcing the coacting clutch element mechanically and axially of the shaft into positive and direct clutching engagement with the fixed clutch element.

10. In a device of the class described, the combination of two shafts in axial alignment, an axially fixed gear secured to one shaft and a coacting clutch element keyed to the other shaft and shiftable axially thereon into endwise mechanical clutching engagement with the teeth of the fixed gear, a synchronizer for causing the gear and element to approach the same speed prior to being moved into an intermeshed position, said synchronizer coacting with the axially fixed gear to form a friction clutch, and camming means between the synchronizer and the shaft carrying the shiftable element for forcing the synchronizer mechanically into a positive clutching engagement with the axially fixed gear.

11. In a synchronizing device, the combination of elements forming a mechanical clutch, a synchronizing device for causing the elements to approach the same speed before moving into clutching relation, said device having a slight freedom of axial movement relative to both elements of the mechanical clutch and movable into engagement with one of said elements to form a friction clutch therewith, the other element and said device provided with means coacting when said other element is moved in its mechanical clutching direction to bear on the device and shift the same axially and thus cause a frictional clutching between said device and the first named element and camming means for causing said frictionally clutched device and element to become more firmly clutched.

12. In combination with two members having clutch jaws to be interengaged, a synchronizer tending to cause them to approach the same speed prior to becoming interengaged, said synchronizer normally disposed in the path of relative movement of the members and adapted to provide a bearing engagement with both members as the members are moved towards their interengaging position, and means controlled by a subsequent slight relative rotary movement between the synchronizer and one of the members when so held in such frictional bearing engagement for forcing the synchronizer into clutching engagement with the other member and thus cause an increase in the clutching effect between the synchronizer and said other member before the jaws are finally moved into their interengaged position.

13. In a motor vehicle having a driving and a driven member, a positive clutch element axially shiftable to connect said members, a friction element to connect said members, releasable means connecting the positive clutch element to said friction element during initial movement toward clutching position, an abutment on one of said members, and a spring between said abutment and said friction element, said spring acting axially and disposed to resist directly the shifting movement of the friction element and operable to disengage such element.

14. In a motor vehicle having driving and driven members in alignment, a shiftable positive clutch element encircling one of the members and engageable with the other member, a friction clutch element within the positive clutch element engaging the encircled member and the positive clutch element and slidable axially relative thereto, a spring surrounding the encircled member, bearing at one end against the friction clutch element and tending to shift the same into an unclutched position, and releasable means adapted to connect the clutch elements during initial shifting of the positive clutch element and until the friction clutch element is in synchronizing relation.

15. In a motor vehicle, the combination of an engine shaft provided at one end with a gear-like positive clutch element having outwardly exposed teeth and having at its end a ring-like insert forming an element of a friction clutch, a propeller shaft having one end intruded into said positive clutch element, an annular member constituting the coacting element of the friction clutch slidably mounted on the propeller shaft, a spring acting on the slidable friction clutch element adjacent its inner periphery and adjacent the propeller shaft and tending to move the annular member into its inoperative unclutched position, a manually actuated coacting positive clutch element turning with the propeller shaft and provided interiorly with gear-like teeth adapted to telescope the annular member and disposed for engaging the positive clutch on the engine shaft and resilient give-away means between the slidable positive clutch element and the slidable friction clutch element for causing the manually actuated element as it is shifted towards its clutching engagement with the engine shaft to first shift the friction clutch element into its clutching engagement with its companion against the resistance of the spring and then to permit the positive element to move therebeyond and into its positive clutch engagement with the engine shaft.

16. In a motor vehicle transmission having driving and driven members, a positive clutch device having an element secured to one member and a cooperating element slidably mounted in driving relation on the other member, means connected to slide said positive clutch element, a friction clutch between said members having a sliding element, yieldable means connecting said sliding element and independent of said positive clutch sliding means to engage said friction clutch upon preliminary movement of the positive clutch element toward engaging position, and spring means associated to disengage the friction clutch.

17. In a motor vehicle transmission having driving and driven members, a positive clutch device axially shiftable to connect said members, a friction device to frictionally connect said members, yieldable means to transmit axial pressure from the positive clutch device to said friction device against the resistance of said friction device, and a spring adapted to resist shifting movement of the friction clutch device and operable to disengage such device.

18. In a motor vehicle transmission having driving and driven power transmitting members, a synchronizing device comprising a friction clutch device slidable on one of the members to frictionally connect said members, a toothed clutch member slidable on the frictional device to positively connect said members, means to transmit sliding movement of the toothed clutch member to the friction clutch device, said means having a yieldable connection to the toothed clutch member, and a spring bearing at one end against one of said power transmitting members and bearing against the friction clutch device to urge said clutch device toward neutral position, said spring being operable to disengage the friction clutch device.

19. In a motor vehicle transmission having a driving and a driven member, a friction clutch element surrounding the driven member and slidably mounted thereon to connect said members in synchronizing relation, a positive clutch element slidably mounted coaxially with said friction clutch element and surrounding substantially the same portion of the driven member surrounded by said friction clutch element, control means to move said positive clutch element to connect said members in positive driving relation, means connecting said elements operated upon initial connecting movement of said positive clutch element to slide said friction clutch element into synchronizing relation, and automatic means connected to said friction clutch element to move it out of synchronizing relation when free of the pressure from said slidable positive clutch element.

20. In a motor vehicle transmission having a driving and a driven member, a hollow positive clutch element shiftable on one of said members to connect said members in positive driving relation, a friction clutch element shiftable on one of said members to engage said members in synchronizing relation, automatic means tending to move said friction element out of synchronizing relation, and means connecting said elements to shift said friction element into synchronizing position, said friction clutch element and said automatic means being surrounded by said positive clutch element, said connecting means being disposed to be engaged and moved into synchronizing relation by the positive clutch element during initial movement thereof toward driving position and said automatic means operating to disengage said friction clutch element.

21. In a motor vehicle having a driving and a driven member, a positive clutch element axially shiftable to connect said members, a friction element to connect said members, releasable means connecting the positive clutch element to said friction element during initial movement toward clutch position, an abutment on one of said members, and a spring independent of the releasable connecting means and located between said abutment and said friction element, said spring being adapted to resist shifting movement of the friction element and operable to disengage such element when released from the pressure of said positive clutch element.

22. In a motor vehicle transmission having a driving and a driven member, a shiftable positive clutch element engageable with one of the members and engaging the other member, a friction clutch element shiftable with the positive clutch element and in advance thereof, said friction clutch element being engaged with the same member as the positive clutch element and synchronizing with the other member, means releasably connecting the friction clutch element with the positive clutch element, said means releasing the connection between the elements after synchronizing has started and prior to engagement of the positive clutch element, and spring means independent of said releasable means and connected with the friction element moving it from synchronizing relation after it has functioned.

23. In a motor vehicle having a driving and driven member in alignment, a shiftable positive clutch element encircling one of the members and engageable with the other member, a friction clutch element within the positive clutch element engaging the encircled member and the positive clutch element and slidable axially relative thereto, an engaging face on the friction clutch element, an abutment on one of the members, an annular spring bearing at its ends against said face and abutment, and releasable means connecting the clutch elements together during initial shifting of the positive clutch element and until the friction clutch element is in synchronizing relation.

24. In a transmission, a driving member, a driven member, positive clutch means between said members, and friction clutch means between said members, said friction clutch comprising an element supported on one member and having a radially disposed friction surface, a clutch element engageable by the positive clutch means and radially disposed cams operable by relative rotary movement between said friction clutch element and the driven member for moving the friction clutch into clutching position.

25. In a transmission, a driving member having a splined end, a driven member having an end adjacent the splined end of the driving member and provided with splines, a slidable positive clutch element having internal splines engaging with the splines on the driven member and engageable with the splined end of the driving member, said driving member having an end portion which permits movement of the positive clutch element inwardly thereof, and a pair of coacting elements having adjacent cam faces, one of the elements constituting a friction element with which the positive clutch element engages when initially moved toward the driving element, the engagement of the positive clutch element with said friction element causing it to rotate relative to the other cam element and camming the friction element axially into frictional engagement with the end portion of the driving member.

26. In a transmission, the combination of a pair of power members including a driving and a driven member, positive clutch means between said members, friction clutch means between said members including a friction element carried by one of the members and having a radially disposed friction face, a pair of coacting cam members carried by the other power member and normally disposed to rotate together and having a slight freedom of relative rotary movement, and relatively displaceable in one axial direction to shift one of said cam members into frictional engagement with said radial friction face, a spring disposed between and bearing against the driving member and said shiftable cam member creating frictional resistance to relative rotary movement therebetween, and said positive clutch means including an element splined to one of the members and movable in its advance into its positive clutching position to hold one of the cam members from rotating with its companion and thus cause the cam members to function and to cause the friction clutch to function prior to the movement of the positive clutching element into its clutching position.

27. In a device of the class described, the combination of a pair of elements constituting a positive clutch, a synchronizer for causing the elements to approach the same speed prior to interengaging, said synchronizer adapted to be housed within the elements when in their positive driving relation having a limited freedom of axial movement, a resilient slip clutch connection between the synchronizer and one of the elements normally in spaced relation to the synchronizer and dissociated therefrom, and a friction clutch between the synchronizer and the other element, said friction clutch provided with interengaging faces and means operatively controlled by the tendency of said faces to turn relative to one of the positive clutch elements following the initial interengaging of the friction clutch faces for increasing the intensity of their engagement.

28. In a device of the class described, the combination of a shaft provided with a pair of splines, a gear mounted for rotary movement about the axis of the shaft and provided with elements of a positive and a friction clutch, a slide member keyed to the shaft and provided with the coacting element of the positive clutch for positively connecting the gear to the shaft, synchronizing means provided with the coacting element of the friction clutch for frictionally connecting the gear and shaft, control means for successively moving the friction clutch and then the positive clutch into operative position, said control means including a part fitting the space between the pair of splines, turning with the shaft and having an axial movement thereon to cause one of said clutches to become operative.

29. In a device of the class described, the combination of a shaft provided with a pair of splines, a gear mounted for rotary movement about the axis of the shaft and provided with elements of a positive and a friction clutch, a slide member keyed to the shaft and provided with the coacting element of the positive clutch for positively connecting the gear to the shaft, synchronizing means provided with the coacting element of the friction clutch for frictionally connecting the gear and shaft, control means for successively moving the friction clutch and then the positive clutch into operative position, said control means including a part fitting in the space between the pair of splines, turning with the shaft and having an axial movement thereon to cause one of said clutches to become operative, and said control means also including means providing a driving connection between the slide member and the synchronizing means whereby one tends to rotate the other.

30. In a device of the class described, the combination of a power member provided with teeth forming an element of a positive clutch and with an element of a friction clutch, mechanism rotating in unison and including a coacting element of the positive clutch shiftable to and from a driving engagement with its companion, said rotating mechanism also including a coacting element of the friction clutch and a one-piece shaft provided with a smooth cylindrical portion forming a mounting for the coacting friction clutch element and provided to one side of the smooth portion with splines providing a support for the coacting positive clutch element and means operatively responsive to the rotary movement of the coacting friction element relative to its mounting for causing the friction clutch to become operative.

31. The combination of two coaxial power transmitting members, each provided with a positively driven toothed clutch element and a positively driven friction synchronizing element, said friction synchronizing elements being frictionally engageable one with the other by a relative axial movement in order to bring said power transmitting members into synchronous rotation prior to the intermeshing of said toothed clutch elements which are also engageable by a relative axial movement, one of said friction synchronizing elements being connected to one of said power transmitting members so as to have a limited relative angular movement and a relative axial movement with respect thereto, said last named power transmitting member and friction synchronizing element having cooperating projections and recesses with inclined walls arranged to be in axial alignment when the synchronizing element is at one point of its possible relative angular movement, the said projections and recesses being disposed a radial distance from the axis at least equal to the radial distance from this axis of the zone of frictional contact between said friction synchronizing elements.

32. The combination of two power transmitting members, one of which is adapted to drive the other, including toothed intermeshable elements one of which is axially movable into and out of engagement with the other, a friction member fixed with respect to one of the toothed elements, a second friction member capable of axial and limited rotary movement with respect to the other toothed element, said second friction member and said other toothed element being provided with cooperating projections and recesses having inclined side walls, said projections and recesses functioning in cooperation with the axial movement of the movable toothed element towards interengagement with its companion to provide an axial force tending to press the frictional surfaces into tighter engagement and a tangential force tending to angularly displace said second friction member with respect to said axially movable toothed element.

33. In a device of the class described, the combination of a pair of coacting clutch jaws coacting to form a male-female clutch having a common axis of rotation and movable axially relative to each other to and from an interdriving position, the bottom of the recess in the female jaw being flat, means between the jaws for causing them to approach the same speed before they assume their interdriving position, said means including a clutch element having an axial movement, the end of said clutch element facing the female jaw being flat and adapted to be intruded into the recess in the female jaw, the opposite end of the clutch element having a clutching face coacting with a similar clutch face on the male jaw to form a friction clutch therewith, camming means operatively connected to draw its power from the relative movement of the jaws and acting on the clutch element for shifting the same along said axis of rotation for causing the friction clutch to become operative with a clutching intensity depending upon the relative movement of the jaws, and a split ring constituting a retractile stop between the clutch element and the other jaw for transmitting axial movement from said other jaw to the clutch element.

34. In a device of the class described, the combination of a positive clutch including a pair of jaws having a common axis of rotation and movable axially relatively to each other to and from an interdriving position, means between the jaws normally disconnected from both jaws for causing them to approach the same speed before they assume said interdriving position, said means including a clutch element having an axial movement and having a clutch face coacting with one of the jaws to form a clutch engagement, a retractile collapsible stop between the clutch element and the other jaw for transmitting axial movement from said other jaw to the clutch element, and power means acting on the clutch element for moving the same toward said other jaw thereby to cause the clutch engagement to increase its effectiveness.

35. In a device of the class described, the combination of a driving shaft provided with an element of a positive clutch fixed against axial movement and provided with a friction clutch face, a driven shaft provided with splines with their ends nearest the driving shaft beveled to form a plurality of circumferentially spaced cams, a coacting element of the positive clutch keyed by means of said splines to the driven shaft and slidable axially thereon to and from a positive clutching engagement, a synchronizer positioned between said elements of the positive clutch for causing them to approach a common speed prior to intermeshing, said synchronizer provided with a friction face cooperating with the first named clutch face to provide a friction clutch between the synchronizer and the driving shaft element, and means including said cams between the synchronizer and said other element for camming the synchronizer into its frictional engagement through said friction clutch.

36. In a device of the class described, the combination of a clutch including a pair of jaws having a common axis of rotation and movable axially relatively to each other to and from and interengaging position, means between the jaws for causing them to approach the same speed before they assume said interengaging position, said means including a clutch element having an axial movement and coacting with one of the jaws to form a friction clutch, said axially movable clutch element provided with a friction clutch surface, a spring stop carried by said clutch element normally disposed in the path of movement of the other jaw and adapted to be engaged by said other jaw to move the clutch element into operative position, and means bearing at one end on the first named jaw and at its other end on the clutch element for disengaging the friction clutch automatically when the jaws are moved into unclutching position.

37. In a synchronizing device, the combination of a shaft, a mechanical clutch including a male and female element, one of said elements being keyed to the shaft and slidable thereon and the other being mounted for rotary movement about its axis and axially fixed relative thereto, said elements adapted to be moved into interdriving position, and a ring synchronizer between the elements for causing them to approach the same speed before they are moved into their interdriving relation, said synchronizer having a slight freedom of movement axially relative to the clutch elements and adapted to be contained entirely within the outlines of the female clutch element when the elements are in interdriving relation, said synchronizer including a combined camming and clutch ring, said ring and shaft provided with camming means coacting to shift the synchronizer toward the axially fixed element, said synchronizer ring provided on its advance side with a friction face adapted to engage with the axially fixed element to form therewith a frictional clutch, and said synchronizer ring adapted to be engaged by the shiftable element in its advance toward its mechanical clutching position to shift the ring synchronizer axially to cause a frictional clutching between the same and the axially fixed element through said friction clutch thereby to cause the synchronizer to assume the same speed of the axially fixed element and thus cause the camming means to function.

38. In a device of the class described, the combination of a power member provided with an element of a positive clutch and with an element of a friction clutch, a shaft, mechanism rotating with the shaft, said mechanism including a coacting positive clutch element, means for frictionally connecting the power member and the coacting positive clutch element, said means including a coacting friction clutch element operatively connected to turn with the coacting positive clutch element, and camming means operatively responsive to relative rotary movement of the shaft and the two friction clutch elements when the clutch elements are engaged for causing them to move axially into a more intense clutching engagement.

39. In a device of the class described, the combination of a pair of positive clutch elements mounted for relative axial movement to and from a clutching position, a synchronizer normally free from both of said elements and adapted when actively disposed to cause the elements to approach the same speed prior to interengaging, means for forming a friction clutch between the synchronizer and one of the positive clutch elements, means operatively responsive to relative rotary movement between the positive clutch elements following the interengaging of the elements of the friction clutch for increasing its frictional engagement, and manually actuated control mechanism including axially movable parts actuated by a shift rod for moving the friction clutch elements into their initial frictional engagement.

HOWARD J. MURRAY.